United States Patent
Sato

(10) Patent No.: US 7,196,727 B2
(45) Date of Patent: Mar. 27, 2007

(54) APPARATUS AND METHOD FOR SENSING AND DISPLAYING IMAGES

(75) Inventor: Kazuya Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 931 days.

(21) Appl. No.: 10/304,794

(22) Filed: Nov. 27, 2002

(65) Prior Publication Data

US 2003/0076435 A1    Apr. 24, 2003

Related U.S. Application Data

(62) Division of application No. 09/028,227, filed on Feb. 23, 1998, now Pat. No. 6,515,704.

(30) Foreign Application Priority Data

Feb. 24, 1997    (JP) .................................. 9-054311

(51) Int. Cl.
*H04N 5/222*    (2006.01)

(52) U.S. Cl. ............................ 348/333.11; 348/333.05

(58) Field of Classification Search ........... 348/333.01, 348/333.05
See application file for complete search history.

(56) References Cited

U.S. PATENT DOCUMENTS

| | | | |
|---|---|---|---|
| 5,123,063 A | 6/1992 | Ohkubo | 382/58 |
| 5,455,910 A | 10/1995 | Johnson et al. | 395/650 |
| 5,564,109 A | 10/1996 | Snyder et al. | 395/828 |
| 5,903,309 A | 5/1999 | Anderson | |
| 5,911,044 A | 6/1999 | Lo et al. | 709/203 |
| 5,935,217 A | 8/1999 | Sakai et al. | 709/249 |
| 5,943,050 A | 8/1999 | Bullock et al. | |
| 5,999,214 A | 12/1999 | Inagaki | |
| 6,122,003 A * | 9/2000 | Anderson | 348/207.99 |
| 6,147,703 A | 11/2000 | Miller et al. | |
| 6,215,523 B1 * | 4/2001 | Anderson | 348/333.05 |

* cited by examiner

*Primary Examiner*—Tuan Ho
(74) *Attorney, Agent, or Firm*—Morgan & Finnegan, LLP

(57) ABSTRACT

According to an image sensing apparatus and an image display method therefor of this embodiment, since a preview image to be photographed and a viewing thumbnail image can be simultaneously displayed on one screen, and the display form can be arbitrarily changed by a simple selection operation on the screen, the visibility and operability of the image sensing apparatus can be largely improved.

11 Claims, 11 Drawing Sheets

PHOTOGRAPHING

PHOTOGRAPHING

VIEWING

PHOTOGRAPHING

PHOTOGRAPHING

APPARATUS AND METHOD FOR SENSING AND DISPLAYING IMAGES

This application is a divisional application of U.S. Ser. No. 09/028,227, filed Feb. 23, 1998, now U.S. Pat. No. 6,515,704, which is incorporated herein in its entirety.

BACKGROUND OF THE INVENTION

The present invention relates to an image sensing apparatus and an image display method therefor and, more particularly, to an image display method of displaying an input image and photographed image in an image sensing apparatus.

A conventional image sensing apparatus such as a digital camera has an image display device such as an LCD, and a display method of switching a state wherein the input image of the CCD camera in photographing is displayed (finder display) and a state wherein the photographed image can be viewed (viewer display) is known well.

Some apparatuses simultaneously display a plurality of thumbnail images (reduced images based on a predetermined file format) to facilitate search for a desired image in the image viewing state.

In an image sensing apparatus allowing continuous photographing, generally, the display is switched from the photographing state to the viewing state after photographing so that the photographed image can be viewed. More specifically, in the conventional image sensing apparatus, the photographing state and viewing state are appropriately switched and displayed by the user operations: the preview image display in the photographing state and the thumbnail image display in the viewing state are switched.

However, the conventional image sensing apparatus such as a digital camera has as its feature portability based on its compact body, and an increase in number of operating buttons is undesirable. For this reason, most conventional image sensing apparatuses assign a plurality of numbers of functions to one operating button. Such an arrangement requires a complex operation to switch the display state or view a desired image. The user must thoroughly read the operation manual to sufficiently understand the functions of the image sensing apparatus; otherwise, the user may erroneously use the apparatus. That is, the conventional image sensing apparatus is not always convenient to use for the user.

In the image sensing apparatus allowing continuous photographing, a plurality of images are continuously photographed, so the photographed images cannot be confirmed during photographing. When a series of movements of, e.g., a golf swing are to be continuously photographed with the conventional digital camera, only the current instantaneous image can be confirmed. That is, the continuous images which have been photographed so far cannot be confirmed during photographing.

In addition, if the user has failed to photograph a desired image, the conventional digital camera requires a series of operations of viewing, confirmation, and delete after all images have been photographed, and the display method has been switched to the image viewing state. This is cumbersome for the user, and simultaneously, since wasteful images are photographed, the load on the memory for storing images increases.

As described above, the advantage of the digital camera, i.e., the instantaneity which allows instantaneous confirmation of the image photographed with the CCD degrades because the finder display and viewer display must be switched on the same screen.

SUMMARY OF THE INVENTION

It is an object of the present invention to provide an image sensing apparatus for simultaneously displaying an object image and an image held in the apparatus, and an image display method therefor.

According to the present invention, the foregoing object is attained by providing an image sensing apparatus comprising an image sensing apparatus comprising input means for inputting an object image to obtain image data, instruction means for generating an instruction for holding the image data input by the input means, hold means for holding the image data input by the input means on the basis of the instruction from the instruction means, and display means for simultaneously displaying the image data input by the input means and the image data held by the hold means.

In accordance with the present invention as described above, in photographing, the user can simultaneously recognize the object image to be photographed and the photographed image already held in the apparatus.

It is another object of the present invention to provide an image sensing apparatus capable of showing details of a photographed image, and an image display method therefor.

According to the present invention, the foregoing object is attained by providing an image sensing apparatus comprising selection means for selecting one of the plurality of second display areas of the display means as an object to be viewed, and wherein the display means displays details of the thumbnail image which has been displayed in the second display area selected by the selection means in the first display area.

In accordance with the present invention as described above, the user can view an arbitrary photographed image.

It is another object of the present invention to provide an image sensing apparatus capable of showing all photographed images, and an image display method therefor.

According to the present invention, the foregoing object is attained by providing an image sensing apparatus comprising the display means having an index area for updating the plurality of thumbnail images displayed in the plurality of second display areas, on the basis of a compressed image held by the hold means.

In accordance with the present invention as described above, even when the number of photographed images is large, the user can view all the images by appropriately operating an index on the display means.

The invention is particularly advantageous since, in photographing, the user can simultaneously recognize the preview image for photographing and a photographed thumbnail image, the visibility and operability of the image sensing apparatus can be largely improved.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
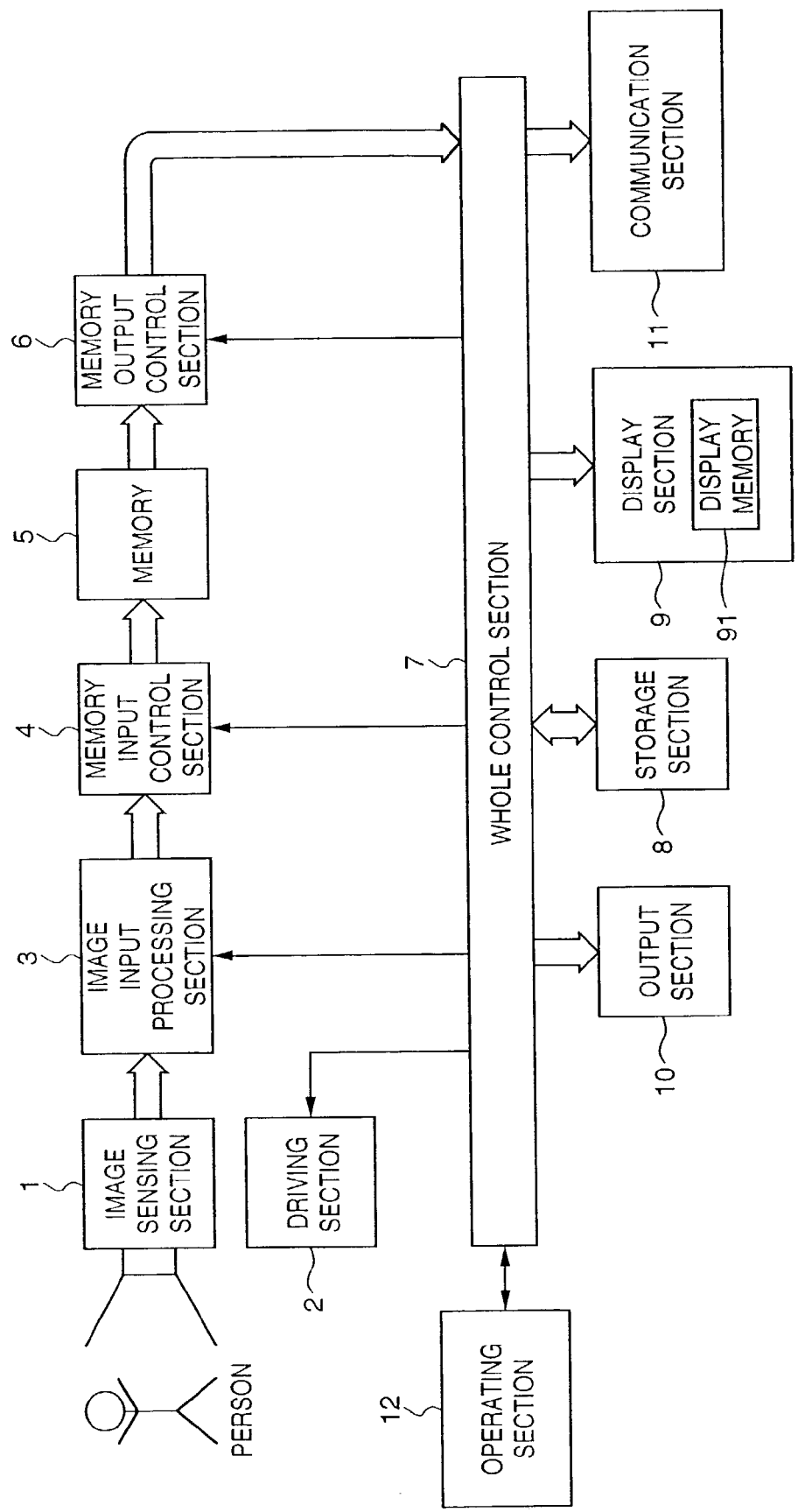
FIG. 1 is a block diagram showing the arrangement of an image sensing apparatus according to the first embodiment.

FIG. 1 is a block diagram showing the arrangement of an image sensing apparatus, i.e., a digital camera according to the first embodiment. Referring to FIG. 1, reference numeral 1 denotes an image sensing section for photographing people, and paintings and calligraphic works; 2, a driving section for moving the photographing range of the image sensing section 1; 3, an image input processing section for converting the image signal input from the camera 1 into image data to be used for various application purposes; 4, a memory input control section for designating a memory area or performing timing control in inputting the image data from the image input processing section 3 in a memory 5; and 6, a memory output control section for designating a memory area or performing timing control in reading out the image data from the memory 5 and transferring the image data to a whole control section 7. The whole control section 7 controls whole processing of receiving image data, processing the image data, and outputting it. The whole control section 7 has a CPU, a ROM, and a RAM. The CPU executes a control program held in the ROM using the RAM as a work area to perform control. Reference numeral 8 denotes a storage section for storing compressed image data; 9, a display section for displaying image data on an LCD or the like; and 10, an output section for printing image data on a recording paper sheet, a communication section 11 for performing communication to transmit/receive image data to/from a partner terminal. The display section 9 has a display memory 91 and displays image data in accordance with contents held in the display memory 91. Reference numeral 12 denote an operating section for inputting a user instruction or notifying the state of the apparatus. The operation section 12 has a shutter button or the like with which the user instructs to receive a still image. The viewing instruction of this embodiment is input from the operating section 12.

The operation of the digital camera according to this embodiment having the above arrangement will be described below. First, the driving section 2 is driven in accordance with an instruction from the whole control section 7 so that the image sensing region from the image sensing section 1 is set at a predetermined position. Next, an image signal input from the image sensing section 1 is converted into image data through the image input processing section 3.

The image sensing section 1 of this embodiment can input not only the still image but also a moving image based on a composite signal of NTSC or PAL. If a composite signal is input, the image input processing section 3 YC-separates it into a Y signal (luminance signal) and C signals (color difference signals) and then separates the C signals into a Cr signal and a Cb signal. The resultant Y, Cr, and Cb signals are A/D-converted. If color space conversion is necessary, color space conversion processing of converting them into R (Red), G (Green), and B (Blue) signals is performed. If format conversion, resolution conversion, or magnification conversion is necessary, pixel density conversion processing, and accordingly, interpolation processing using a filter and the like are performed.

The image data prepared in the above manner is stored in a predetermined area of the memory 5 designated by the memory input control section 4. Under the control of the whole control section 7, when the image data stored in the memory 5 is to be output onto a recording paper sheet, the image data is transferred to the output section 10 and output. When the image data is to be stored, the image data is compressed and then transferred to the storage section 8 and stored. When the image data is to be displayed, the image data is transferred to the display memory 91 of the display section 9 and displayed. When the image data is to be transferred to a distant place or another terminal, the image data is transferred to the communication section 11 and transmitted. In this embodiment, the image data temporarily stored in the memory 5 is displayed in a predetermined area of the display section 9 as a photographing preview image. The compressed image data stored in the storage section 8 is displayed in a predetermined area of the display section 9 as a viewing thumbnail image.

The image display method of the display section 9 as the characteristic feature of this embodiment will be described next.

Figure 2:
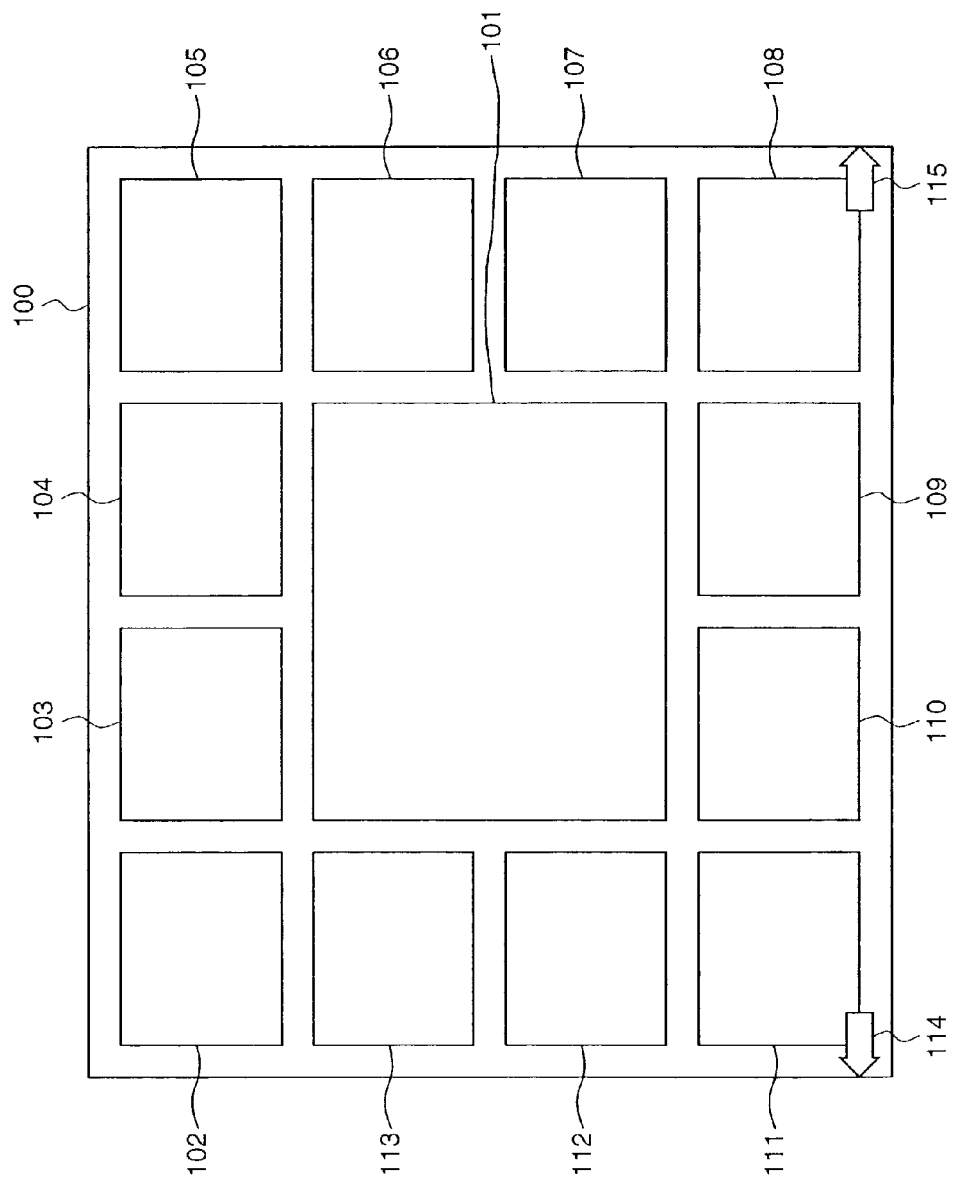
FIG. 2 is a view showing the layout of the display screen in the first embodiment.

FIG. 2 is a view showing a display layout example of the display section 9. Referring to FIG. 2, reference numeral 100 denotes an actual entire display screen of the display section 9, which is constituted by, e.g., an LCD; 101, a main image display portion as a window at the center of the screen, on which a photographing preview image is mainly displayed; and 102 to 113, a plurality of subwindows at the peripheral portion of the screen, on which photographed viewing thumbnail images are displayed in time series. When the initial position of the viewing thumbnail image display is set at, e.g., the subwindow 102, the viewing thumbnail images are sequentially displayed on the subwindows 102 to 113 in time series. Arrows 114 and 115 at the lower portion of the display screen 100 indicate indices which are selected to switch the viewing thumbnail images to earlier or later images. For example, by a simple operation equivalent to the general window operation of moving the cursor and clicking it on the screen to select the index 114 or 115, the viewing thumbnail images on the subwindows 102 to 113 are switched.

Figure 3:
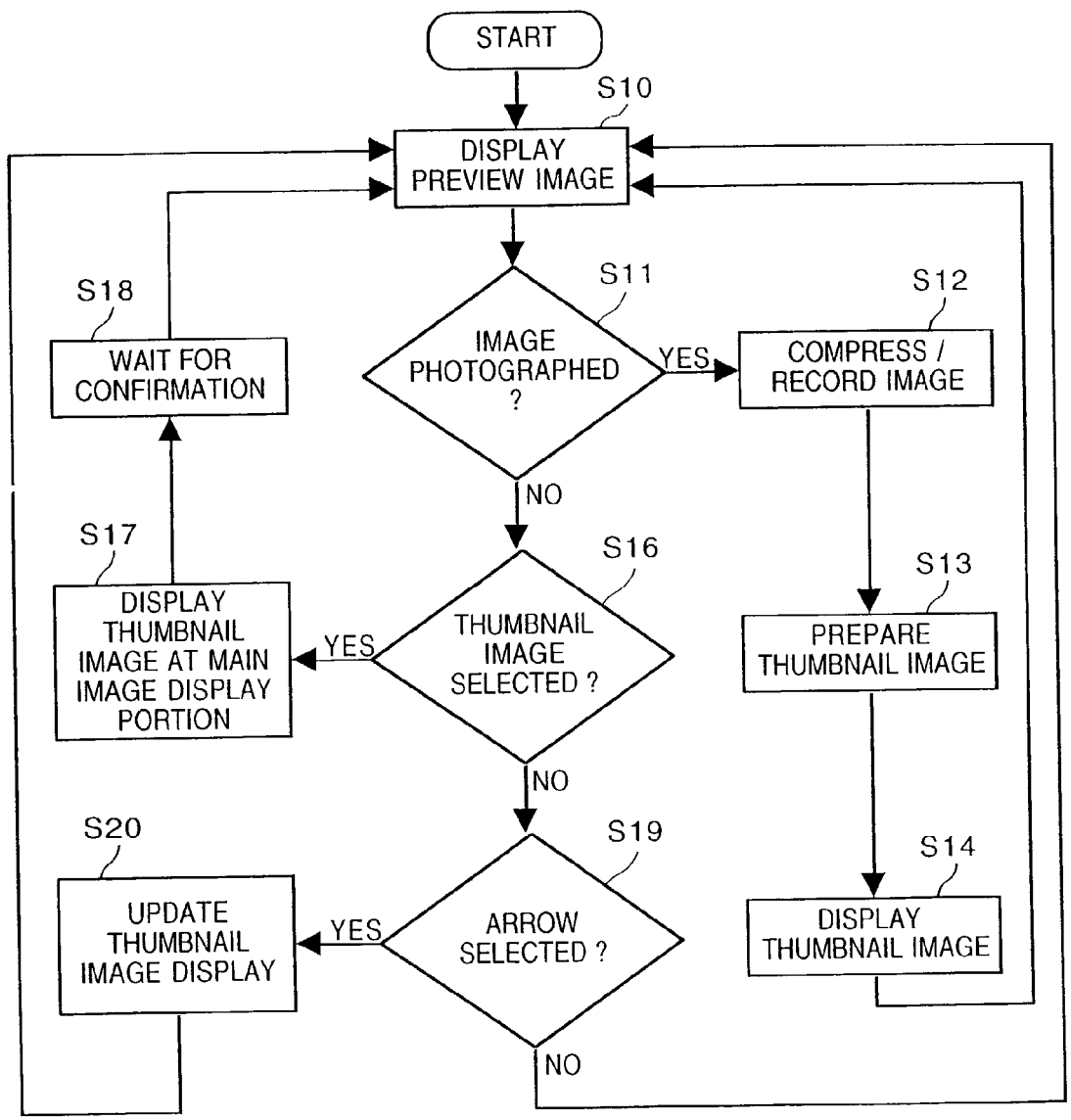
FIG. 3 is a flow chart showing image display processing in the first embodiment.

Display processing of this embodiment will be described next in detail with reference to FIGS. 3 to 7. FIG. 3 is a flow chart showing image display processing of this embodiment. The processing shown in the flow chart is controlled by the whole control section 7. FIGS. 4 to 7 are views for explaining the thumbnail image display method of this embodiment.

Simultaneously with the start of photographing, the preview image of an object to be photographed is displayed on the main image display portion 101 of the display section 9. The user photographs the object while observing the preview image (S10).

It is determined whether photographing is performed, i.e., whether the user depresses the shutter of the operating section 12 to instruct to receive the preview image in the memory 5 (S11). If YES in step S11, the photographed image is subjected to processing such as compression and then stored in the storage section 8 (S12). At this time, to update the thumbnail images to be displayed on the subwindows 102 to 113 at the peripheral portion of the screen, a thumbnail image based on the new compressed image stored in the storage section 8 is prepared and stored in the display memory 91 (S13). The new thumbnail image is displayed on an appropriate one of the subwindows 102 to 113 (S14).

Figure 4:
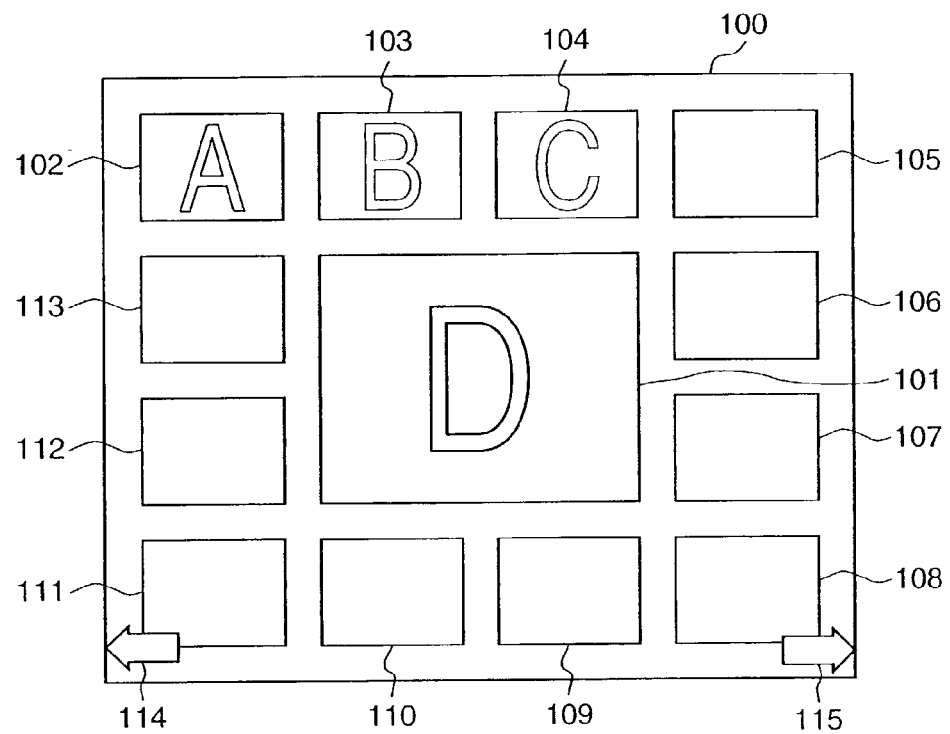
FIGS. 4 to 7 are views for explaining a thumbnail image display method of the first embodiment.
Figure 4:
Figure 4:
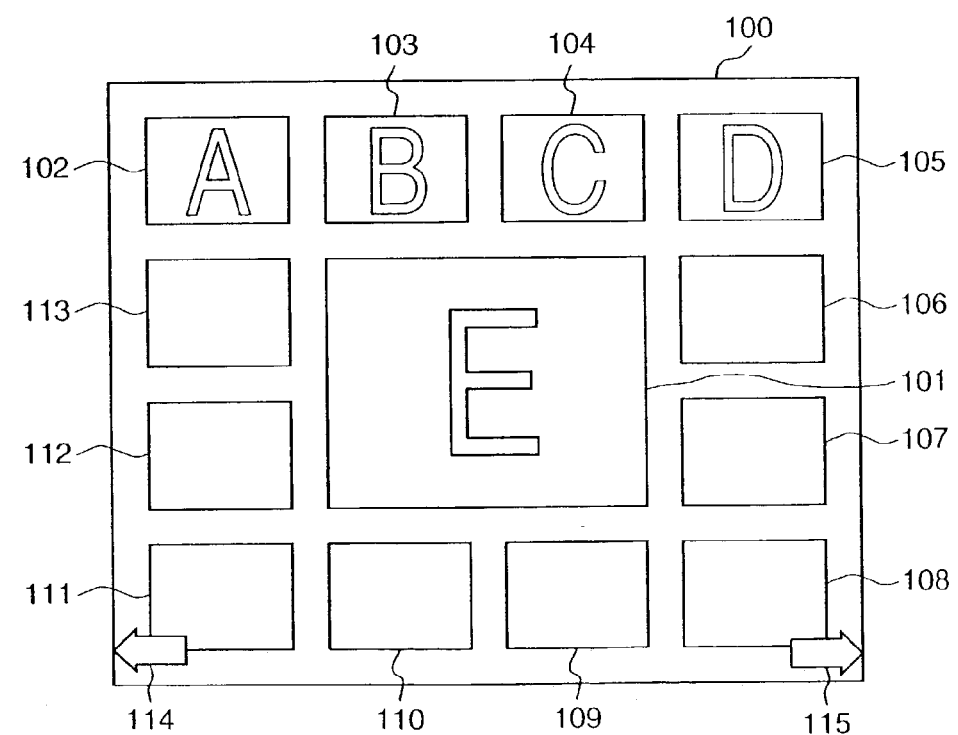

In the subwindows 102 to 113 of this embodiment, e.g., the initial position is set at the subwindow 102, and the thumbnail images are displayed in the clockwise direction every time a new image is photographed. An example is shown in FIG. 4. The upper half of FIG. 4 shows a state wherein the photographed thumbnail images are sequentially being displayed in the subwindows 102 to 104 from the oldest image. When a photographing instruction for the preview image displayed on the main image display portion 101 is generated, the preview image is newly stored in the storage section 8, and at the same time, displayed on the subwindow 105, as shown at the lower half of FIG. 4. More specifically, a thumbnail image is displayed on the subwindow 102 first. Every time a new compressed image is stored in the storage section 8, thumbnail images are sequentially displayed on the subwindows 103 to 113.

Figure 5:
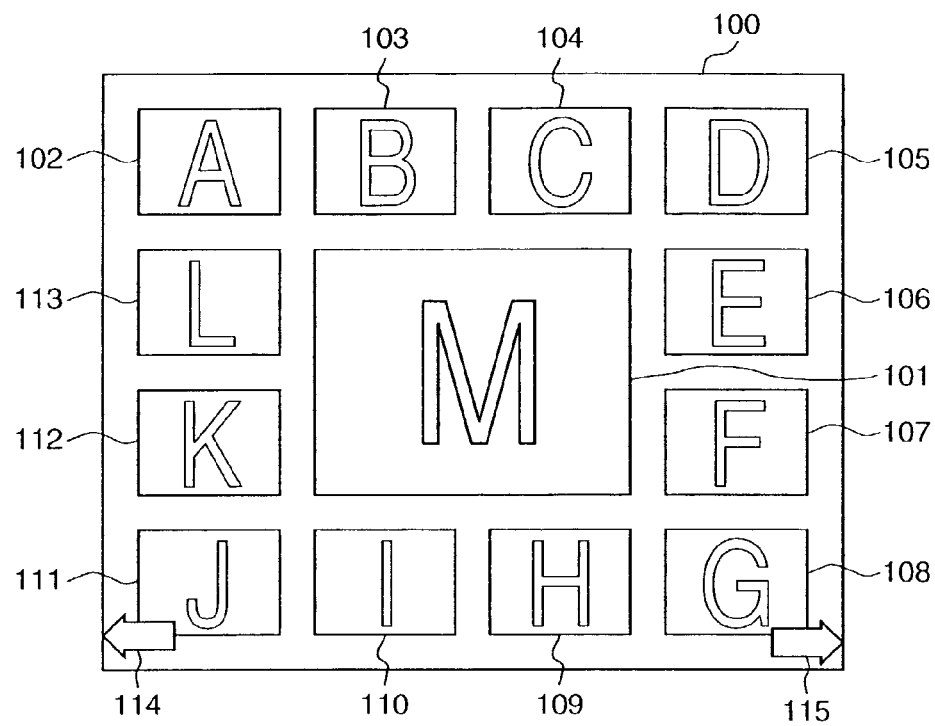
Figure 5:
Figure 5:
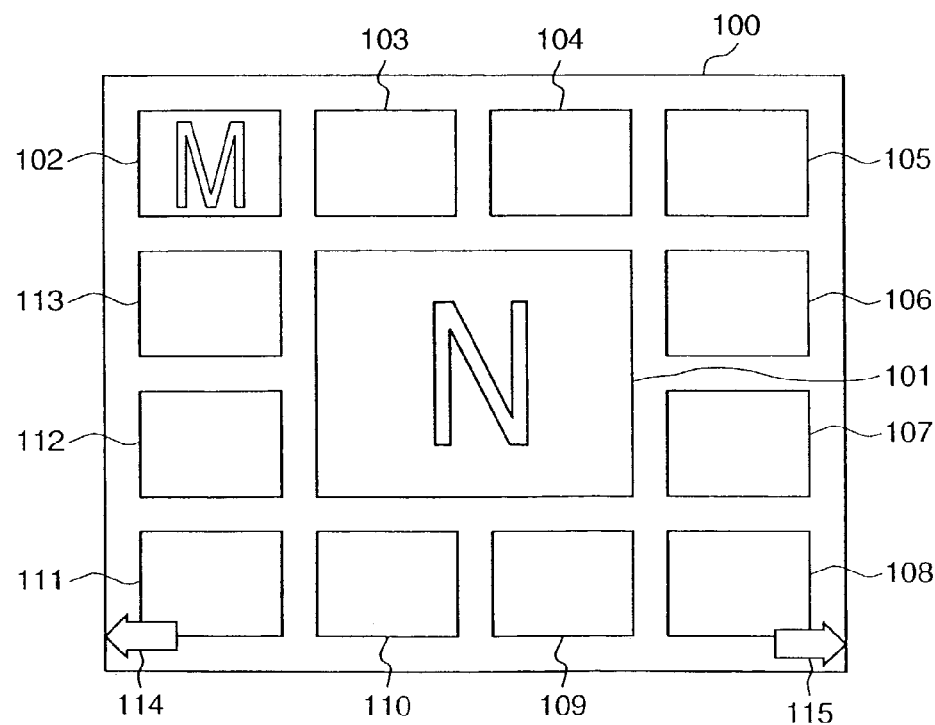

As shown in FIG. 5, after the thumbnail image is displayed on the subwindow 113 upon making round of subwindows for thumbnail image display, new thumbnail images are sequentially displayed in the clockwise direction from the subwindow 102 every time a new image is photographed. More specifically, when a photographing instruction for the thumbnail image displayed on the main image display portion 101 at the upper half of FIG. 5 is generated, display on the subwindows 102 to 113 is cleared, and the new thumbnail images are sequentially displayed from the subwindow 102. In this embodiment, the thumbnail images displayed on the subwindows 102 to 113 at the upper half of FIG. 5 are deleted from the screen as a new thumbnail image is displayed, as shown at the lower half of FIG. 5. In this case, the thumbnail images deleted from the screen are merely deleted from the display memory 91, and the corresponding compressed image data are still held in the storage section 8. Therefore, the image data can be read out from the storage section 8 by operating the index 114 or 115, so each thumbnail image can be displayed on an appropriate subwindow again.

If NO in step S11, it is determined whether any one of the thumbnail images displayed on the subwindows 102 to 113 is selected by the user operation of the operating section 12 (S16). Selection of a thumbnail image, i.e., a viewing instruction is input by, e.g., moving the cursor and clicking it. This viewing instruction may also be input by directly selecting a thumbnail image on the display screen by a pen input.

Figure 6:
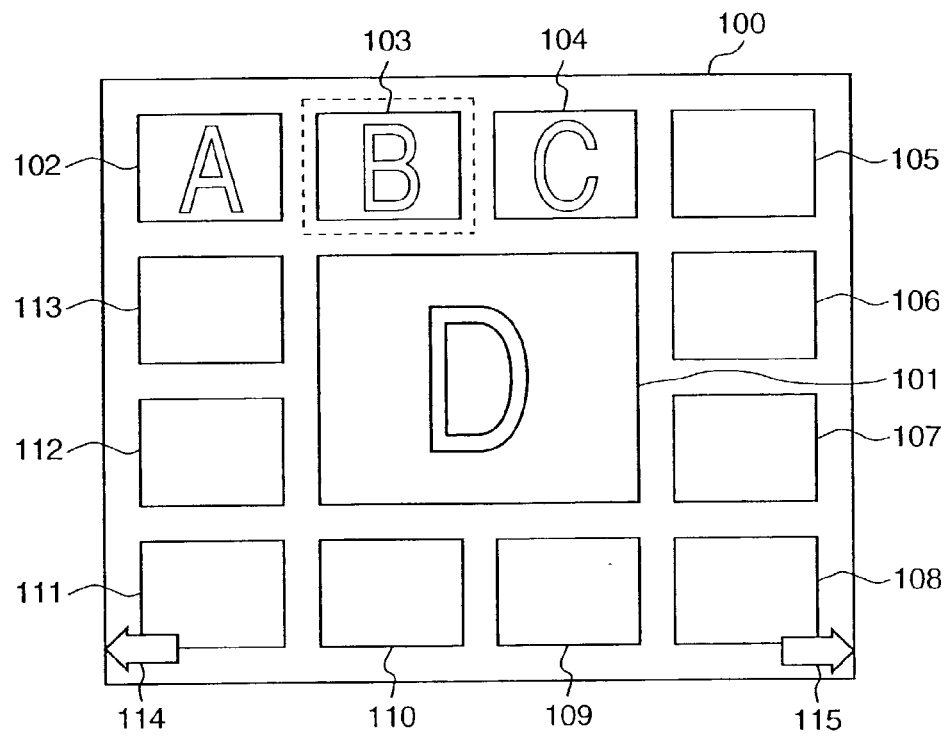
Figure 6:
Figure 6:
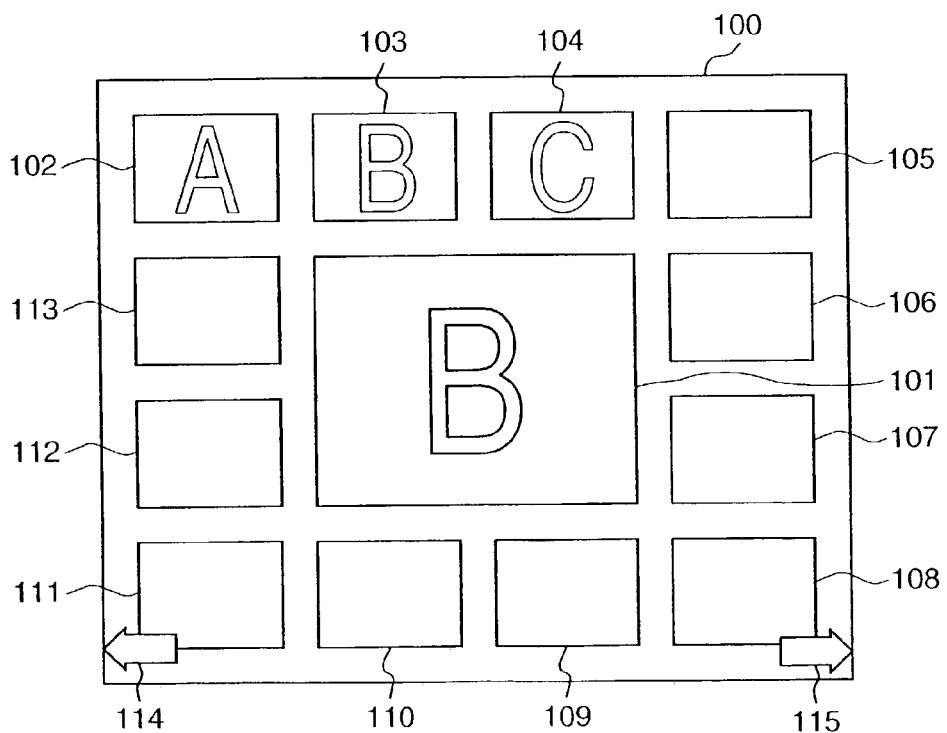

If YES in step S16, compressed image data corresponding to the selected thumbnail image is read out from the storage section 8, expanded, and enlarged so the details are displayed at the main image display portion 101 at the center of the screen (S17). FIG. 6 shows this state. In FIG. 6, the thumbnail image on the subwindow 103 is designated as a viewing image.

When an instruction for completion of confirmation of the enlarged and displayed thumbnail image, i.e., completion of viewing the photographed image is input by the user (S18), display at the main image display portion 101 is returned to the normal preview image (upper half of FIG. 6) (S10).

Figure 7:
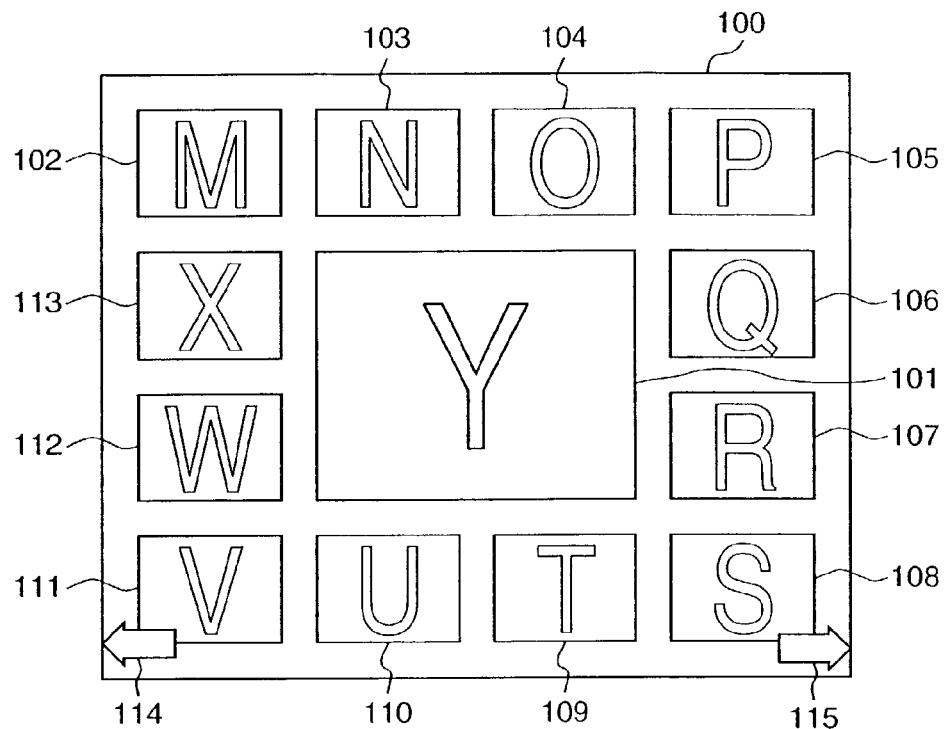
Figure 7:
Figure 7:
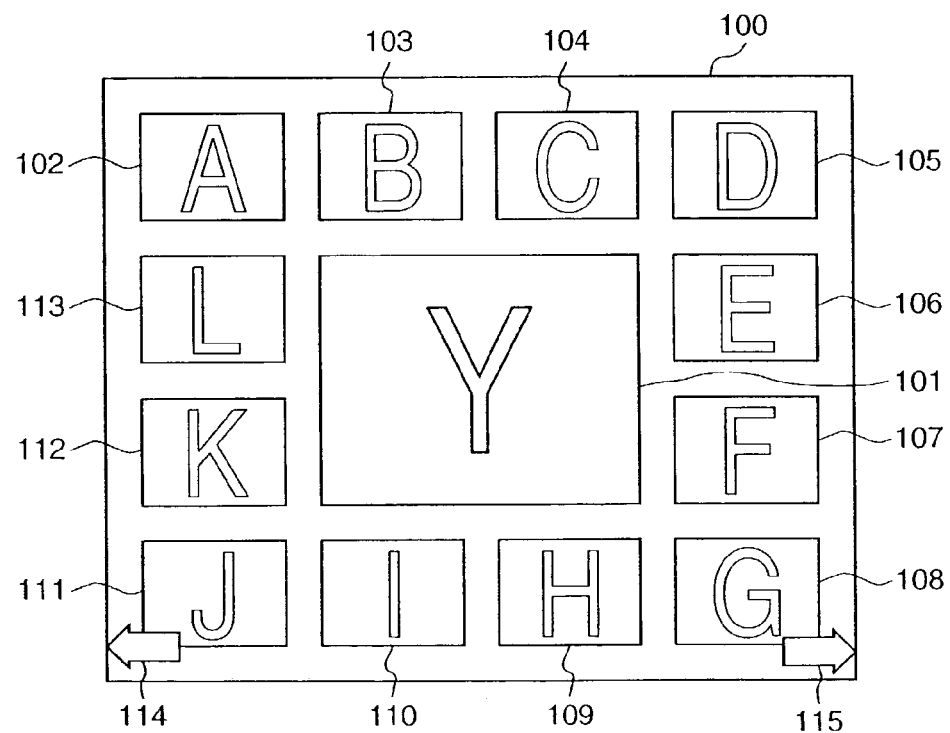

If NO in step S16, it is determined whether the index 114 or 115 is selected (S19). If the index 114 or 115 is selected, earlier or later images to be displayed on the subwindows 102 to 113 are sequentially determined from the compressed image group stored in the storage section 8 to update thumbnail image display on all the subwindows 102 to 113 (S20). FIG. 7 shows this state. In FIG. 7, the index 114 is selected to replace all thumbnail images with earlier images. If the index 115 is selected in the state shown at the lower half of FIG. 7, the display returns to that shown at the upper half of FIG. 7, as a matter of course. In this embodiment, an arbitrary thumbnail image is be searched for by operating the indices 114 and 115, and when an arbitrary thumbnail image is selected as described above, details of the image can be viewed. In addition, photographed images in an arbitrary photographing period can be confirmed.

As described above, according to the first embodiment, the preview image for photographing and thumbnail image for viewing can be simultaneously displayed on the same screen. In addition, since the display form can be arbitrarily changed by a simple selection operation on the screen, the visibility and operability in the image sensing apparatus can be largely improved.

The image quality modes (the modes are classified into "fine", "normal", and "economy" depending on the data compression rate) of an image displayed in this embodiment, and the size of the main image display portion 101 or the subwindows 102 to 113 are not limited to specific ones, and they can be arbitrarily set in accordance with the compression scheme (e.g., JPEG) or file format (e.g., TIFF) used for the images.

First Modification of First Embodiment

Figure 8:
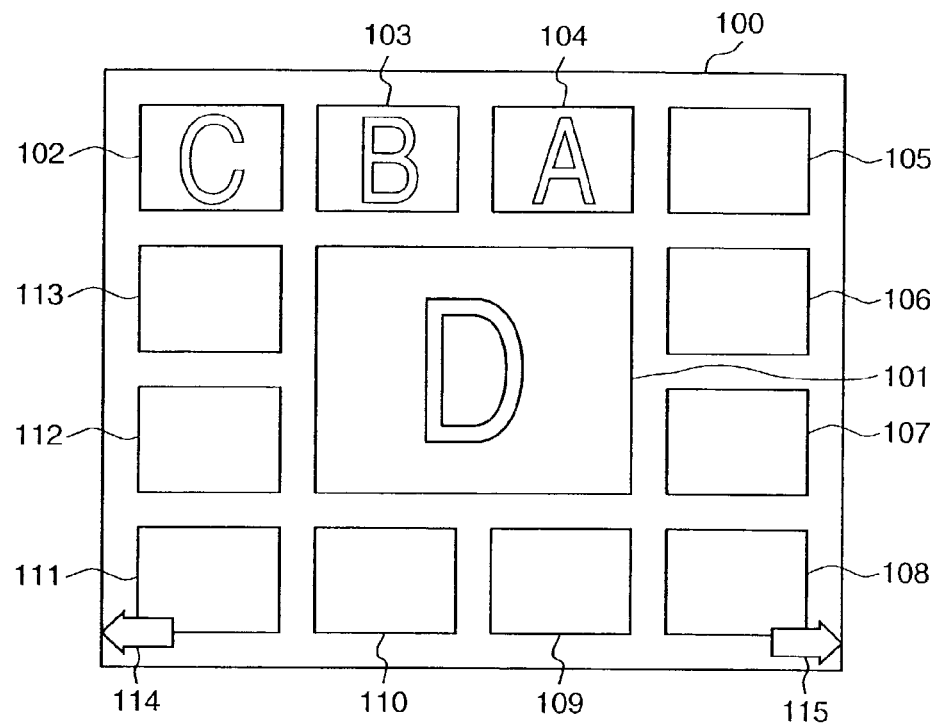
FIG. 8 is a view for explaining a thumbnail image display method of the first modification of the first embodiment.
Figure 8:
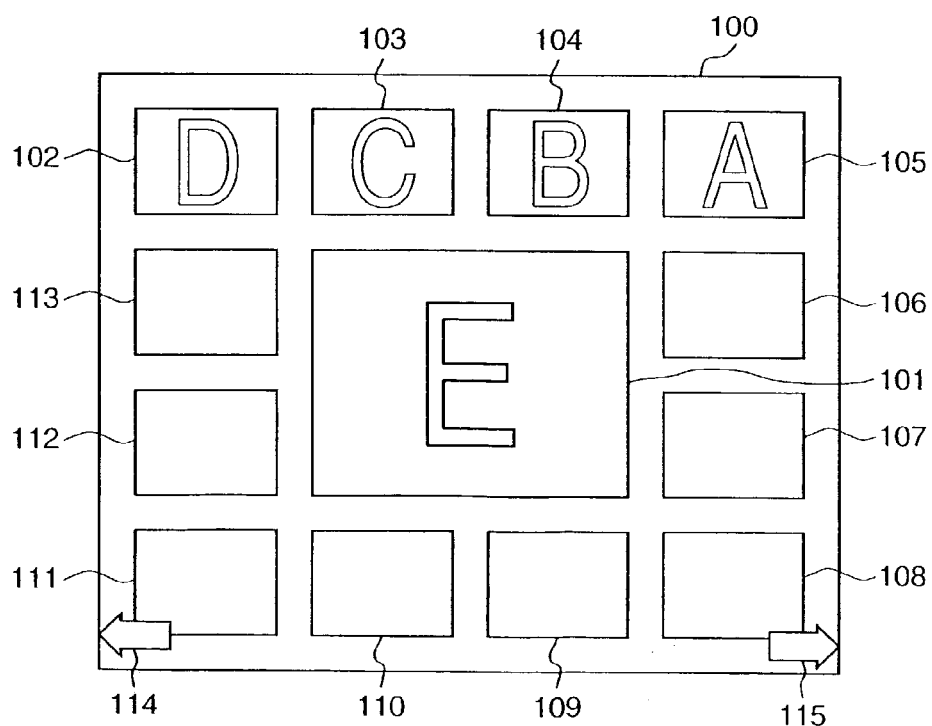

In the first embodiment, as shown in FIG. 4, thumbnail image are sequentially additionally displayed in the clockwise direction on the subwindows at the peripheral portion of the screen every time a new image is photographed. However, the present invention is not limited to this. For example, the latest image may be always displayed on a predetermined window set as the initial position, and the thumbnail image previously displayed on the subwindow may be shifted in the clockwise direction and redisplayed. FIG. 8 shows this example. In FIG. 8, the latest thumbnail image is always displayed on the subwindow 102. When a photographing instruction for the preview image which is being currently displayed at the main image display portion 101 is generated, the preview image is stored in the storage section 8, and simultaneously, the thumbnail image of the image is displayed on the subwindow 102. At this time, the thumbnail images displayed on the subwindows 102 to 104 are sequentially shifted by one area to the subwindows 103 to 105, respectively, and displayed, as shown at the lower half of FIG. 8.

When the latest thumbnail image display area is fixed, the user can always recognize the latest photographed image at a glance.

Second Modification of First Embodiment

Figure 9:
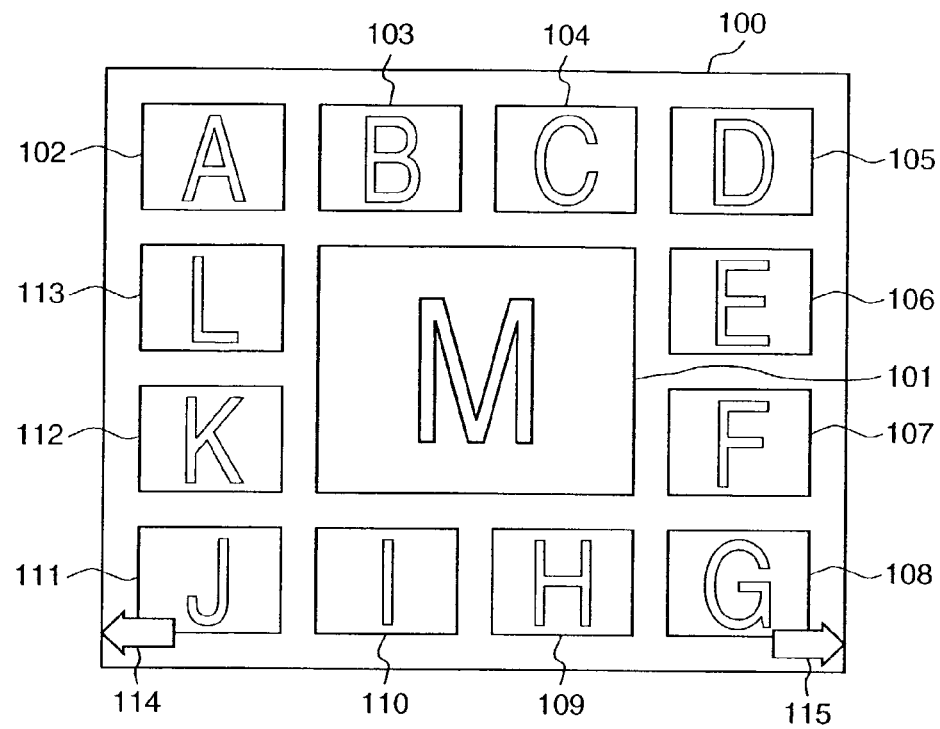
FIG. 9 is a view for explaining a thumbnail image display method of the second modification of the first embodiment.
Figure 9:
Figure 9:
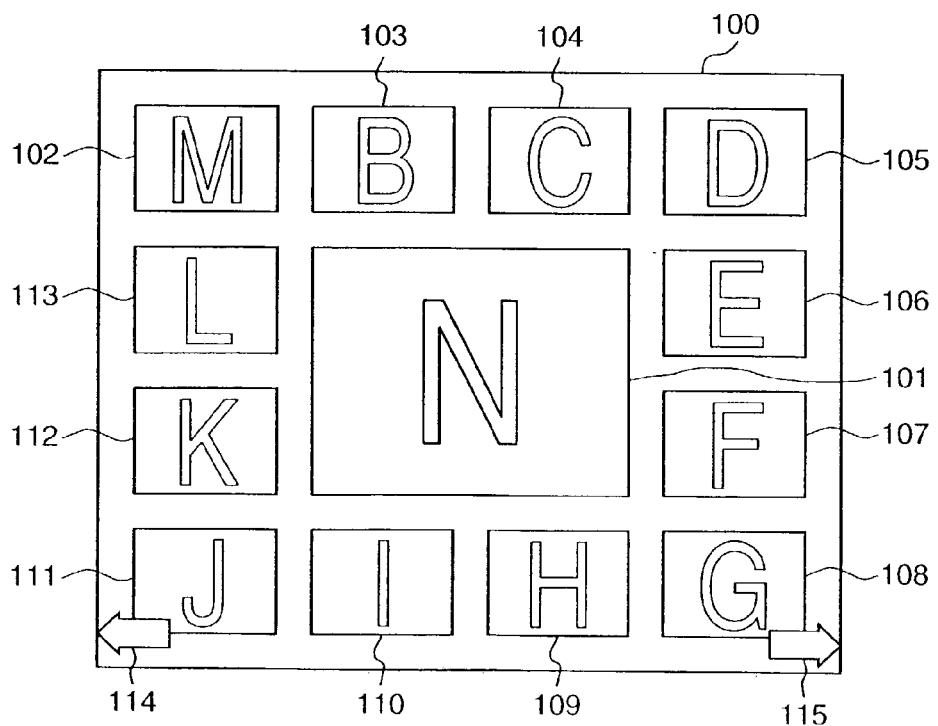

In the first embodiment, as shown in FIG. 5, when thumbnail images are displayed on all the subwindows 102 to 113, display on the subwindows 102 to 113 is cleared upon newly performing photographing. However, the present invention is not limited to this example. For example, when a new image is photographed after thumbnail images have been displayed on all the subwindows 102 to 113, only display on the subwindow 102 as the initial position may be updated to the latest thumbnail image without changing display on the remaining subwindows. FIG. 9 shows this example. In FIG. 9, when the thumbnail image displayed at the main image display portion 101 shown at the upper half of FIG. 9 is photographed, only thumbnail image display on the subwindow 102 is updated, as shown at the lower half of FIG. 9. In this example, when the next image is photographed, only thumbnail image display on the subwindow 103 is updated. In the same manner, thumbnail image display is sequentially updated clockwise every time a new image is photographed.

When only the latest thumbnail image is updated without clearing all the subwindows upon photographing a new image while thumbnail images are being on all the subwindows, the user can always refer to a predetermined number of newly thumbnail images (12 thumbnail images in this embodiment). In this case, to identify the latest thumbnail image, a predetermined mark may be effectively added to the latest thumbnail image.

Second Embodiment

The second embodiment of the present invention will be described below.

Figure 10:
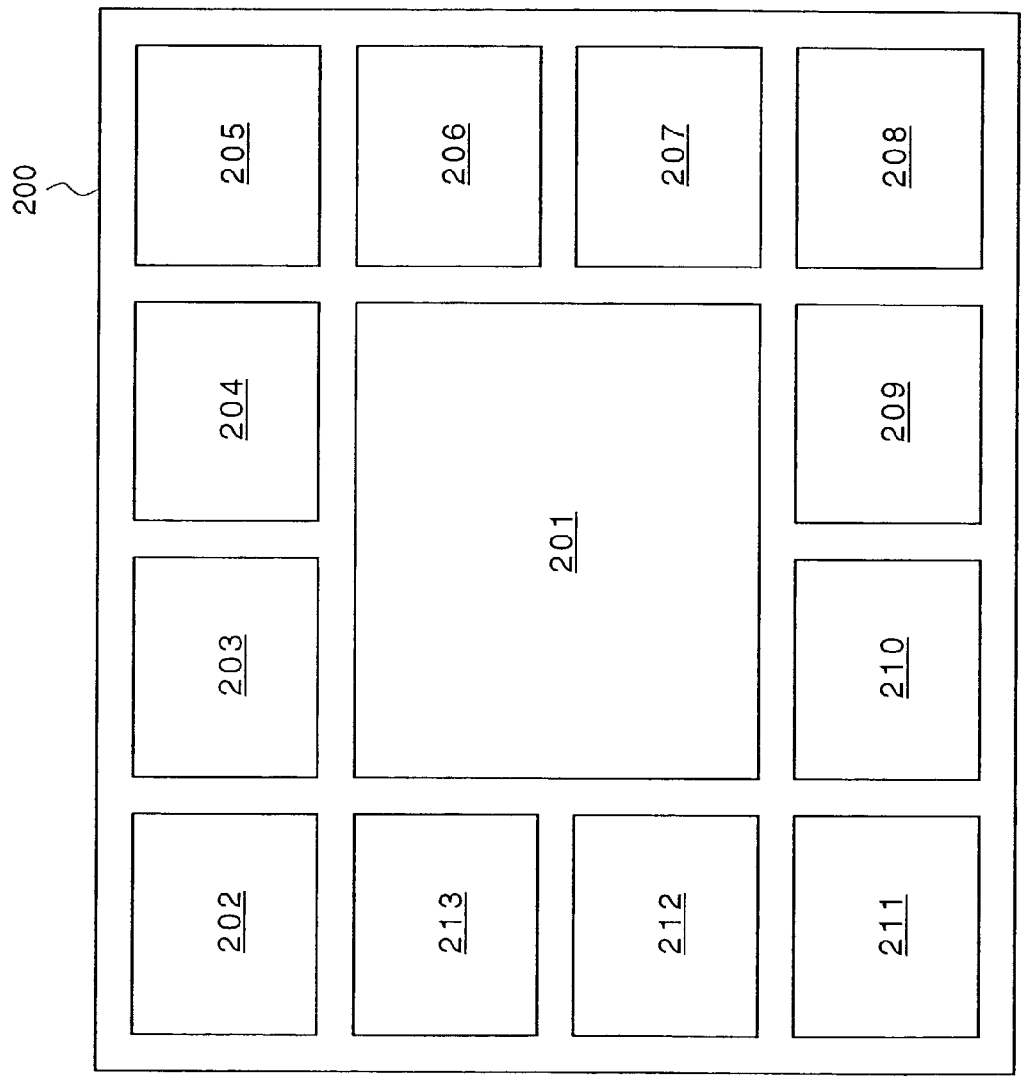
FIG. 10 is a view showing the screen display in a TV conference system according to the second embodiment.

In the second embodiment, the image display method of the digital camera described in the first embodiment is applied to a TV conference system. FIG. 10 shows an example of the display screen of a TV conference system.

Referring to FIG. 10, reference numeral 200 denotes a display screen; 201, a main image display portion for displaying a speaker in the TV conference or reference data for conference; and 202 to 213, peripheral portions as subwindows which display participants of the conference.

The operation will be described next.

When the display screen of the image display method for a digital camera as shown in FIG. 3 is to be applied to a simple TV conference system, the speaker and the conference reference such as an original or drawing are enlarged and displayed at the main image display portion 201 at the center while the participants of the conference are displayed at the peripheral portions 202 to 213.

The speaker displayed at the main image display portion 201 is automatically switched. When a person displayed at the peripheral portion as a conference participant is to speak, he/she is displayed at the main image display portion 201 while the image of the previous speaker is displayed at the peripheral portion as a participant. The display is automatically switched in this manner so that the conference progresses. The user can observe the progress of the conference while recognizing the conference participants and the current speaker without operating the camera.

When the camera is connected to a telephone line, the apparatus can be used as a TV phone terminal. In this case as well, the partner can be displayed at the main image display portion 201 at the center while the recent portraits of family members or colleagues are displayed at the peripheral portions 202 to 213.

As described above, according to the second embodiment, the method of simultaneously displaying images for different dimensions such as photographing and viewing can be applied to a simple TV conference terminal or a simple TV phone terminal. Therefore, a simple TV conference system for a small group can be easily constituted using inexpensive communication protocol or TV conference software. In addition, persons in outdoors can participate the conference using the simple TV conference system in units of companies or groups through mobile communication.

Third Embodiment

The third embodiment of the present invention will be described below.

In the third embodiment, a digital camera having, as its characteristic feature, the image display method according to the above-described first embodiment is applied to the image reception terminal of a fixed camera monitor system. The display screen is the same as in FIG. 10.

The digital camera of the first embodiment can be applied to the image reception terminal of a fixed camera monitor system, which receives images from monitor cameras set in department stores, various stores, banks, financial agencies, warehouses, factories, transport facilities, or the like and displays the received image using the communication section 11.

More specifically, images received from monitor cameras are displayed on peripheral portions 202 to 213, i.e., subwindows of a screen 200 shown in FIG. 3, and an image of interest is enlarged at a main image display portion 201 to display details. With this method, the user can obtain more specific monitor information.

According to the third embodiment, by applying the digital camera described in the first embodiment to the monitor camera system, a more inexpensive and functional camera monitor system can be constituted.

The digital camera can also be applied to a portable image reception terminal by taking the advantage of portability of the digital camera. This image reception terminal can be carried as a monitor terminal for patrolling stores. An application purpose for a portable terminal used in leaving the monitor room can also be considered.

OTHER EMBODIMENTS

The object of the present invention can be realized even by supplying a storage medium storing program codes shown in the above-described flow chart to a system or an apparatus, and causing the computer (e.g., a CPU) of the system or the apparatus to read out and execute the program codes stored in the storage medium, as a matter of course. In this case, the program codes read out from the storage medium achieve the new functions of present invention by themselves, and the storage medium storing the program codes constitutes the present invention. As the storage medium for supplying the program codes, a floppy disk, a hard disk, an optical disk, a magnetooptical disk, a CD-ROM, a magnetic tape, a nonvolatile memory card, a ROM, or the like can be used.

Figure 11:
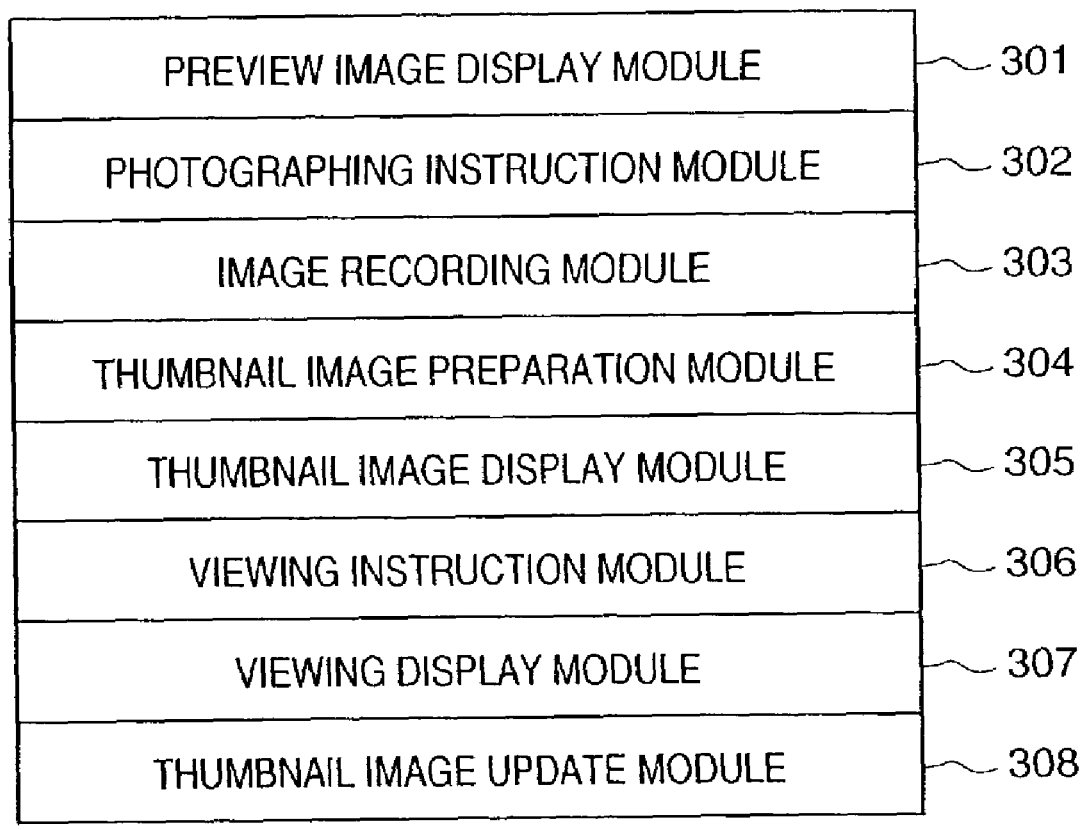
FIG. 11 is a view showing the structural features of the control program of the present invention.

FIG. 11 shows the structural features of the program of the present invention. Modules shown in FIG. 11 corresponds to the respective steps of the flow chart shown in FIG. 3.

The functions of the above-described embodiments are realized not only when the readout program codes are executed by the computer but also when the OS running on the computer performs part or all of actual processing on the basis of the instructions of the program codes to realize the function of the above-described embodiments, as a matter of course.

The present invention can be applied to a system constituted by a plurality of devices such as a scanner, an interface, and a host computer, or to an apparatus comprising a single device such as a video camera.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
   an input unit adapted to input an object image to obtain image data;
   an instruction unit adapted to generate an instruction for holding the image data input by said input unit;
   a hold unit adapted to compress and hold the image data input by said input unit on the basis of the instruction from said instruction unit; and
   a display device having a first display area for displaying the image data input by said input unit as a preview image and a plurality of second display areas for displaying a plurality of thumbnail images based on the compressed image data held by said hold unit and simultaneously displaying the preview image and the thumbnail images,
   wherein said plurality of second display areas are arranged around said first display area, and said display device sequentially displays the thumbnail images from the earliest image in a predetermined direction.

2. The apparatus according to claim 1, wherein when new compressed image data is held by said hold unit on the basis of an instruction from said instruction unit, and the thumbnail images are being displayed in all of said plurality of second display areas, said display device displays a thumbnail image based on the new compressed image data in said second display area as the initial position.

3. The apparatus according to claim 1, wherein when new compressed image data is held by said hold unit on the basis of an instruction from said instruction unit, and the thumbnail images are being displayed in all of said plurality of second display areas, said display device clears the display in all of said plurality of second display areas and then displays a thumbnail image based on the new compressed image data in said second display area as the initial position.

4. An image sensing apparatus comprising:
   an input unit adapted to input an object image to obtain image data;
   an instruction unit adapted to generate an instruction for holding the image data input by said input unit;
   a hold unit adapted to compress and hold the image data input by said input unit on the basis of the instruction from said instruction unit; and
   a display device having a first display area for displaying the image data input by said input unit as a preview image and a plurality of second display areas for displaying a plurality of thumbnail images based on the compressed image data held by said hold unit and simultaneously display the preview image and the thumbnail images,
   wherein said plurality of second display areas are arranged around said first display area, and said display device sequentially displays the thumbnail images from the latest image in a predetermined direction.

5. The apparatus according to claim 4, wherein when new compressed image data is held by said hold unit on the basis of an instruction from said instruction unit, and the thumbnail images are being displayed in all of said plurality of second display areas, said display device displays a thumbnail image based on the new compressed image data in said second display area as the initial position.

6. The apparatus according to claim 5, wherein when new compressed image data is held by said hold unit on the basis of an instruction from said instruction unit, and the thumbnail images are being displayed in all of said plurality of second display areas, said display device clears the display in all of said plurality of second display areas and then displays a thumbnail image based on the new compressed image data in said second display area as the initial position.

7. An image display method for an image sensing apparatus, comprising:
   inputting an object image to obtain image data;
   generating an instruction for photographing the image data;
   compressing and holding, in a memory, the input image data on the basis of the photographing instruction; and
   simultaneously displaying the input image data as a preview image in a first display area of said display and the plurality of thumbnail images based on compressed image data held in said memory in a plurality of second display areas of said display,
   wherein said plurality of second display areas are arranged around said first display area, and in displaying the thumbnail images, the thumbnail images are sequentially displayed from the earliest image in a predetermined direction.

8. The method according to claim 7, wherein in displaying images, when new compressed image data is held in said memory on the basis of the photographing, and the thumbnail images are being displayed in all of said plurality of second display areas, a thumbnail image is displayed based on the new compressed image data in said second display area as the initial position.

9. The method according to claim 8, wherein in displaying images, when new compressed image data is held in said memory on the basis of the photographing instruction, and the thumbnail images are being displayed in all of said plurality of second display areas, the display in all of said plurality of second display areas is cleared and then a thumbnail image is displayed based on the new compressed image data in said second display area as the initial position.

10. An image display method, comprising:
    simultaneously displaying input image data as a preview image in a first display area of a display and the plurality of thumbnail images based on compressed image data held in memory in a plurality of second display areas of said display,
    wherein said plurality of second display areas are arranged around said first display area, and in displaying the thumbnail images, the thumbnail images are sequentially displayed from the latest image in a predetermined direction.

11. The method according to claim 10, wherein in displaying images, when new compressed image data is held in said memory on the basis of a photographing instruction, and the thumbnail images are being displayed in said plurality of second display areas, a thumbnail image is displayed based on the new compressed image data in said second display area as an initial position.

* * * * *